Dec. 19, 1933.  T. E. STEIBER  1,940,030
MEANS FOR FACILITATING THE TAKING-OFF AND LANDING
OF AIRCRAFT AND REFUELING THE SAME
Filed Feb. 2, 1931  4 Sheets-Sheet 1
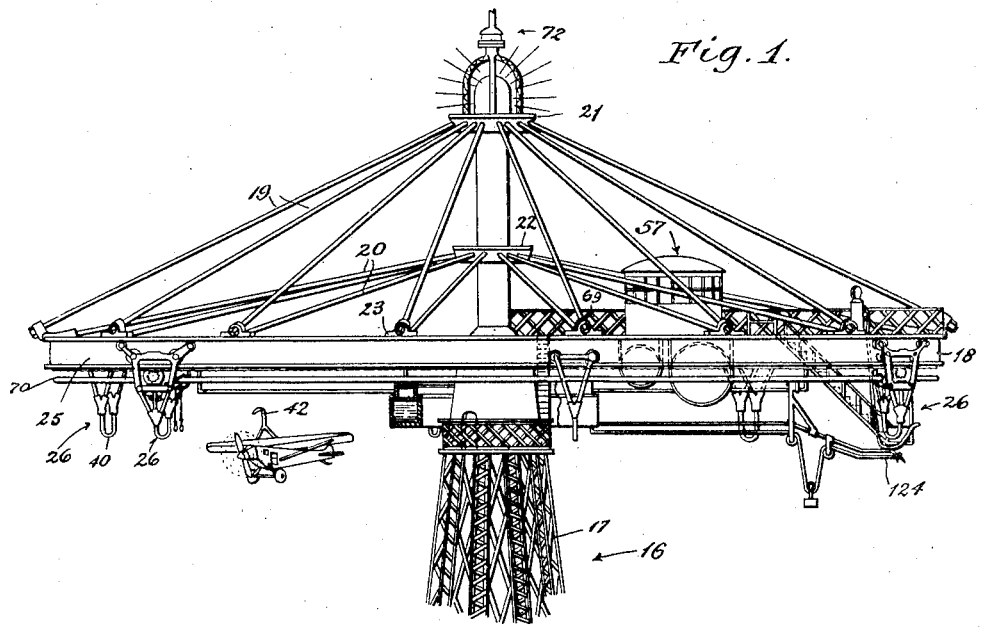
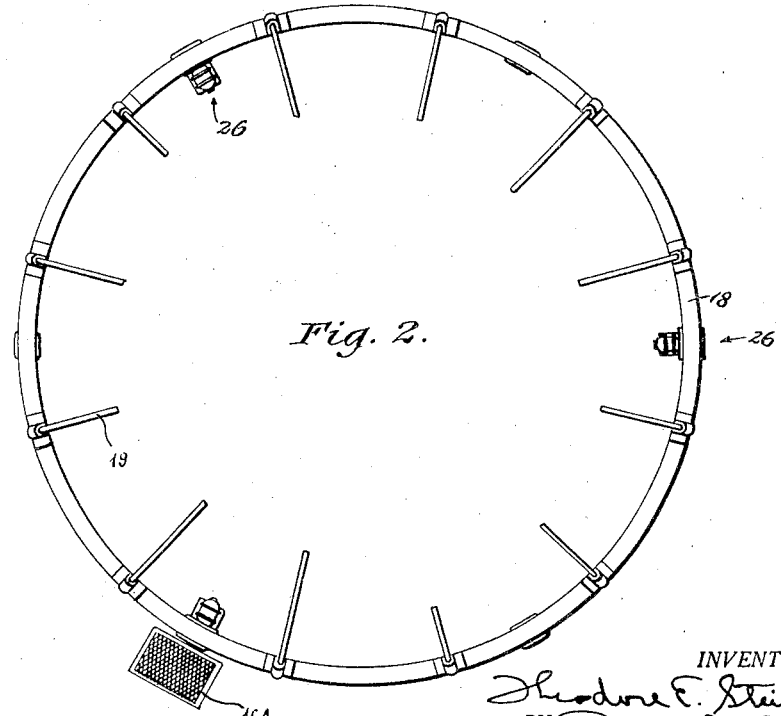
INVENTOR.
Theodore E. Steiber
BY
ATTORNEY Dec. 19, 1933.  T. E. STEIBER  1,940,030
MEANS FOR FACILITATING THE TAKING-OFF AND LANDING
OF AIRCRAFT AND REFUELING THE SAME
Filed Feb. 2, 1931  4 Sheets-Sheet 2
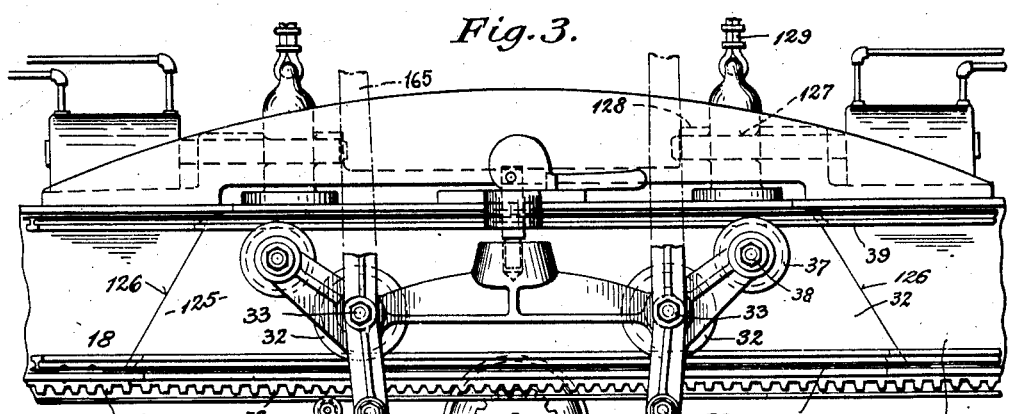
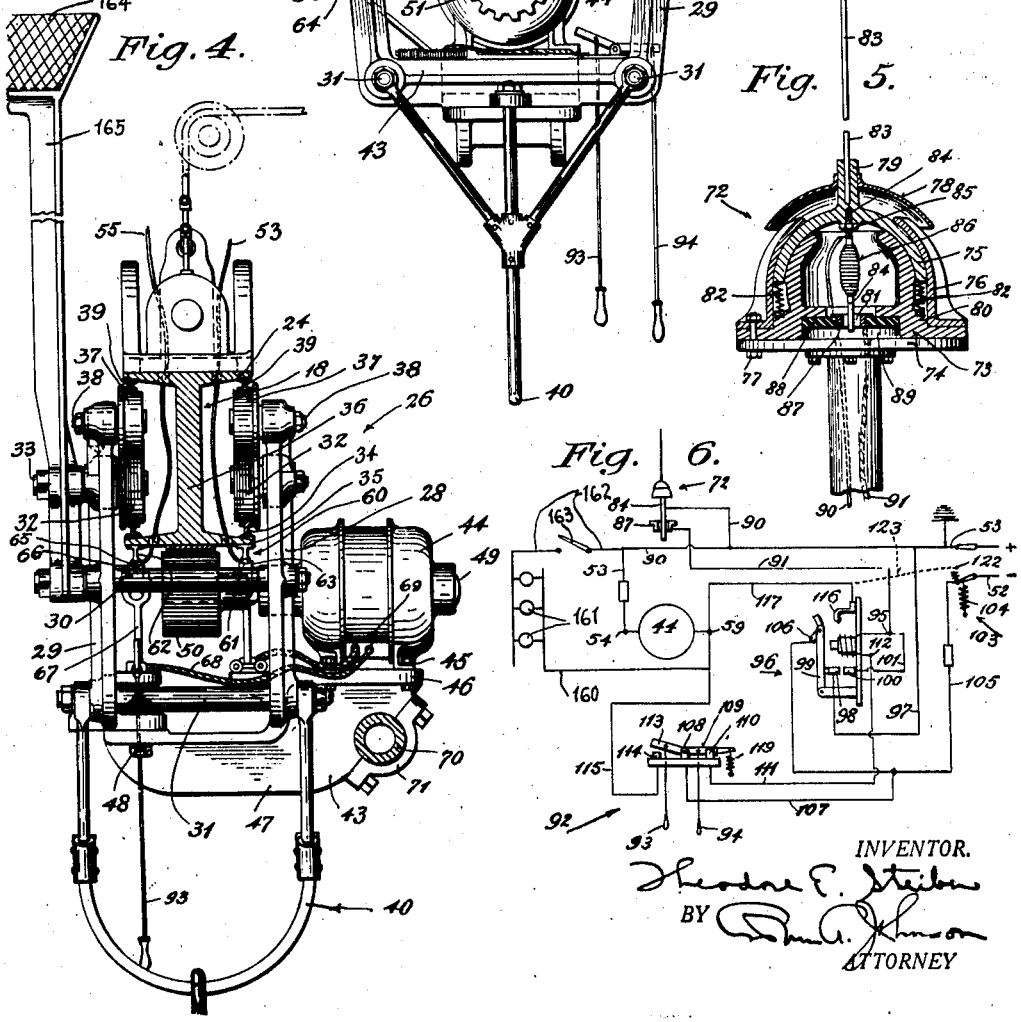
INVENTOR.
Theodore E. Steiber
BY
ATTORNEY Dec. 19, 1933.   T. E. STEIBER   1,940,030
MEANS FOR FACILITATING THE TAKING-OFF AND LANDING
OF AIRCRAFT AND REFUELING THE SAME
Filed Feb. 2, 1931    4 Sheets-Sheet 3

INVENTOR.
Theodore E. Steiber
BY
ATTORNEY

Dec. 19, 1933.                T. E. STEIBER                1,940,030
        MEANS FOR FACILITATING THE TAKING-OFF AND LANDING
                OF AIRCRAFT AND REFUELING THE SAME
                     Filed Feb. 2, 1931         4 Sheets-Sheet 4
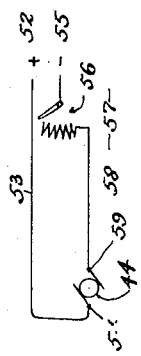
INVENTOR.
Theodore E. Steiber
BY
       ATTORNEY Patented Dec. 19, 1933

1,940,030

UNITED STATES PATENT OFFICE 1,940,030

MEANS FOR FACILITATING THE TAKING-OFF AND LANDING OF AIRCRAFT AND REFUELING THE SAME

Theodore E. Steiber, Bridgeport, Conn., assignor of one-half to Arthur A. Johnson, Bridgeport, Conn.

Application February 2, 1931. Serial No. 512,824

13 Claims. (Cl. 244—2)

This invention relates to improved means for facilitating the taking off and landing of aircraft, particularly those of the heavier than air type.

In my copending application, Serial No. 484,499, filed September 26, 1930, I have disclosed a structure which an airplane may approach at flying speed and become attached to, to be refueled without stopping; or, if desired, the airplane, after becoming attached to the structure, may be stopped to discharge and/or receive passengers, freight, fuel, etc., or change pilots, after which the plane, while still attached to the structure, may be brought to flying speed and then become detached from the structure and proceed on its way.

To accomplish these results, my invention provided a tower having a circular track or rail of substantial circumference upon which a carriage is mounted to travel around the tower, the carriage being provided with means to engage co-operating means on an airplane for the purpose of catching and supporting the latter. In said application, the carriage is caused to move by the airplane engaging it and pulling it around in the circular track. Similarly in the "take off", the airplane, while being supported by the carriage, pulls the carriage around in the circular track until the airplane approaches flight speed, whereupon it is released from the carriage.

It is an object of the present invention to improve the airplane device disclosed in my aforesaid application by providing a carrier which may itself be driven at substantially the same speed as airplane flight sustaining speed before the airplane engages it, and thereafter slowed down or stopped; and which may again itself be driven at substantially airplane flight sustaining speed while supporting the airplane to facilitate the "take-off".

This is accomplished, according to the present preferred embodiment of the invention, by providing a power drive for a carrier which catches and supports the airplane and is so arranged that it can be started either by a ground operator or by the airplane while it is in flight, and can be slowed down or stopped either by the ground operator or by the pilot while the airplane is still moving, after the latter engages the carrier. Also, the same arrangement, under control of the ground operator or a person in the airplane, can be and preferably is used to carry the airplane and give it impetus in order to facilitate the "take off".

Other features and advantages will be disclosed hereinafter.

In the drawings—

Figure 1 is an elevation of the preferred form of the invention, and shows an airplane approaching the driven carriers of the present invention.

Fig. 2 is a plan view of the circular track which supports the carriers.

Fig. 3 is a detail view of the airplane carrier, and shows the driving arrangement between the carrier and the circular track.

Fig. 4 is an end view of the carrier shown in Fig. 3.

Fig. 5 is an elevation, partly in section, of the airplane actuated switch for the carrier driving mechanism.

Fig. 6 is a diagrammatic view of the electrical circuit.

Fig. 9 is a detail view of the carrier driving mechanism for the device shown in Figs. 7 and 8, and shows the means for movably supporting the carrier.

Fig. 10 is a wiring diagram of the circuit used with the present invention.

Figure 7:
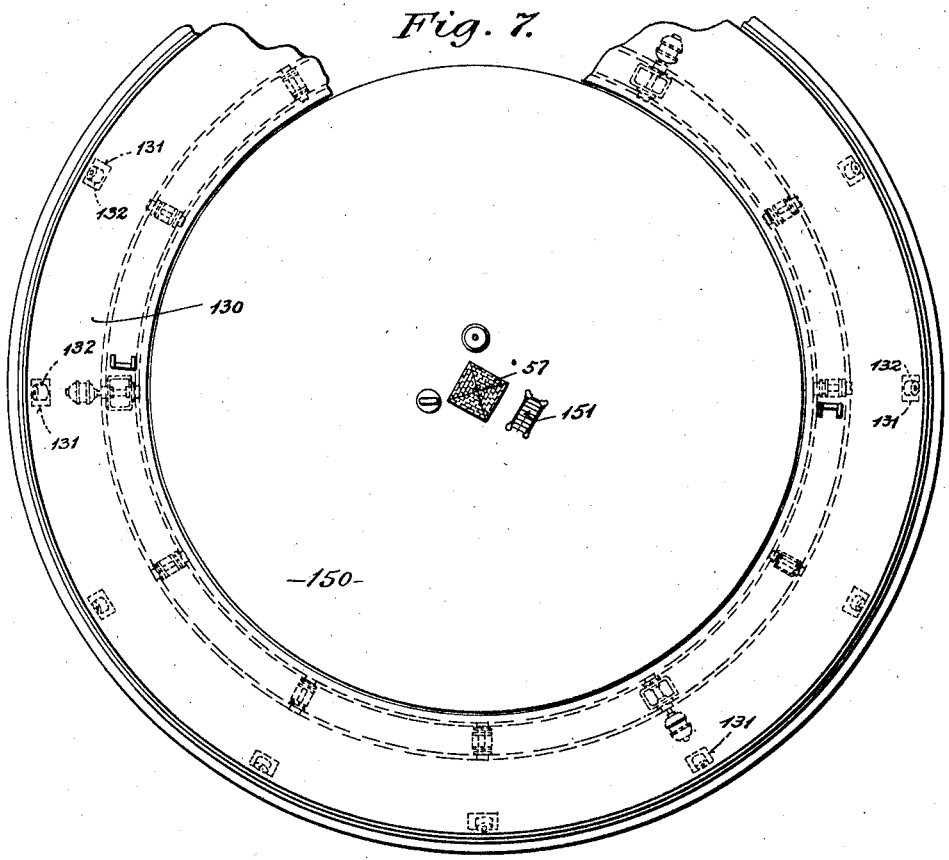
Fig. 7 is a plan view of a modified form of the invention in which the airplane carrier is a large rotatable circular disc upon which the airplane may alight, power driven and airplane actuated, if desired, as with the preferred form shown in Figs. 1 to 6.

In my hereinbefore mentioned copending application, Serial No. 484,499, there was disclosed an airplane supporting structure similar to the device herein shown in Figs. 1 to 4, comprising a tower 16 preferably formed of latticed iron work 17 rising to a substantial height from a suitable foundation on the ground or upon the roof of a building, the present invention being especially applicable upon buildings where at best there is only a very limited amount of space.

At its upper end the tower 16 carries a circular track 18 substantially coaxial with the tower and as large in circumference as the height of the tower and other conditions permit. The circular track is supported on the tower by two sets of radial guy rods 19 and 20 secured at their inner ends to hubs 21 and 22 respectively on the tower and at their outer ends to the brackets 23 which are riveted to the top horizontal web 24 of the I beam 25 which constitutes the circular track 18. There may be as many guy rods, or sets of guy rods, as sound structural engineering may dictate, and other connections between the tower and rail may be effected in any conventional and satisfactory manner.

Similar to the mechanism disclosed in my co-pending application hereinbefore referred to, the present invention provides means whereby an airplane may "land" or "take off" from the device. This means in its preferred form with the present invention comprises a carrier 26 or a plurality of carriers, if desired, adapted to ride upon the track 18. This carrier may be of any suitable form; in the present showing it comprises a body portion 27 made of two side plates 28 and 29 which are spaced and held with respect to each other by two sets of cross bolts 30 and 31. Each of the side plates is provided with a set of lower rollers 32 on studs 33 to engage the lower rails 34 on the lower web 35 of the circular track 18 at each side of the central web 36; and near the top each of the side plates supports a set of upper rollers 37 on studs 38 to engage the upper rails 39 on the top web 24 of the I beam to prevent the carrier 26 from rocking in a vertical plane and prevent undesired rocking movement of the carrier in a plane transverse to the plane of the I beam.

Preferably, the rollers 32 and 37 are provided with antifriction bearings to enable the carrier 26 to travel freely on the lower rails 34. The upper sets of rollers are made to normally just clear the lower surface of the rail 37 when the carrier in normal position is on the track 18, thereby further reducing the frictional resistance of the carrier to travel.

The carrier is provided with means to engage cooperating means on the airplane, to support the latter. For this purpose, a catch bar 40 is secured to the carrier body 27 and is suitably braced by rods 41. The catch bar is preferably formed as a bail and extends below the body of the carrier so that it may be engaged by any suitable hook-like device 42 on the airplane.

With the carrier and support so far described, it would be possible, as pointed out in my co-pending application, for a pilot to navigate an airplane so that the hook-like device 42 engages the catch bar 40 of the carrier, at the same time propelling the carrier about the track 18, and thereafter throttle down the airplane motor or motors, until the airplane and carrier momentum is spent.

Coming now to some of the important aspects of the present invention, it should be particularly noted that the carrier 26 is provided with a bracket 43 projecting from the side plate 28 to form a suitable support for an electric motor 44, which is preferably of the variable speed type. The motor is held upon the bracket by bolts 45 which extend through suitable holes provided therefor in the table portion 46 of the bracket. This bracket is preferably made integral with one of the side plates and is provided with a plurality of webs 47 extending to the opposite side plate 29 where it is fastened with bolts 48, for the purpose of providing additional support for both the motor and the carrier. One end of the motor shaft 49 extends transversely within the carrier 26 where it is provided with a gear 50, which is fixed against rotation thereon with a key 51. This gear is adapted to cooperate with a rack 52 welded to the bottom of the circular track 18 and extending entirely therearound.

This mechanism makes it possible to automatically propel the carrier 26 on the rollers 32 about the track 18 at a high rate of speed. Preferably, the speed of the electric motor and the ratio between the gear 50 and the rack 51 is such that the carrier 26 will be driven at a speed substantially equivalent to the airplane flight sustaining speed. Thus, when an airplane approaches the airplane supporting device of the present invention, the carrier, with the driving arrangement of the present invention, will be made to move at substantially the same speed as the airplane. Consequently, when the two engage, there will be no danger of a shock to the airplane, the carrier, or to the supporting structure, or any part thereof, as might occur when an airplane passing at a fairly high rate of speed engages any stationary object, even though it is not very heavy and is supported for free travel with a minimum of friction. Broadly then, the arrangement is such that when current is introduced into the electric motor 44, the gear 50 is caused to rotate against the rack 51 and thereby drive the carrier forwardly at a predetermined rate of speed, and is shut-off by means hereinafter described, after the airplane engages the catch bar 40 and until the momentum of the carrier and airplane is spent.

The wiring circuit for the electric motor 44 might, as shown in diagrammatic form in Fig. 10, comprise any suitable source of current 52 with one lead 53 running direct to a motor terminal 54, and a second lead 55 running to a rheostat switch 56, in an operator's room 57, thence through a wire 58 to a second motor terminal 59. The wire 53 may be passed over the guy rods 19 or 20 to the I beam 25 where, as shown in Fig. 4, it passes through small holes provided therefor in the webs 24 and 35 to be connected to a current rail 60 on the I beam, comprising the current-carrying rod 61 and the insulator 62, the rod being engaged at all times by a roller 63 on the spring bar 64 on the carrier 26 for connection through the lead 53 to a terminal 54 of the motor 44.

The other wire 55 extends from the source of current supply to the rheostat switch 56 which is preferably located in the operator's room 57 and then passes through the wire 58 which may be passed over one of the guy rods 19 or 20 to the I beam 25 where it is passed through the small holes provided therefor to be connected to a second current rail 65 mounted on another insulator 62, thence through a roller 66 and a second spring bar 67 and lead 58 to the second terminal 59 of the electric motor 44.

With this arrangement, the operator in the house 57 merely manipulates the rheostat switch 56 when he sees an airplane approaching the landing structure, stepping it up until he has the motor 44 driving the carrier 26, as hereinbefore described, traveling about the circular track 18 at substantially the same speed that the airplane is flying at in a circuitous route underneath the circular track where the catch bar 40 engages the hook-like device 42 on the airplane and thereafter the airplane pilot may throttle down or stop the airplane motors and the operator may gradually retard the rheostat switch until the electric motor and carrier are brought to a stop adjacent the landing platform 68 shown in Fig. 1. The platform is provided with a runway 69 extending to the tower 16 where the passengers may take an elevator (not shown) to the base of the landing device.

In order to discharge and/or receive passengers, fuel or change pilots, the driving arrangement of the present invention between the carrier 26 and the circular track 18 facilitates the work of moving the airplane into position alongside of the landing platform 69, for the operator may close the motor circuit to drive the airplane supporting carrier into any desired station which is more positive than with my previous structure, disclosed in my aforesaid copending application, wherein the carriers were free floating on the circular track and depended upon airplane propeller action in order to move the carrier and airplane to any desired location on the circular track.

This carrier propelling device of the present invention also greatly facilitates the "take-off" of the airplane, for it is merely necessary for the operator to cut in the rheostat switch 56 after the airplane is prepared for "take-off", advancing the switch until the electric motor 44 drives the carrier 26 at airplane flight sustaining speed, and at the same time the pilot in the airplane advances the airplane motor speed until the speedometer indicates airplane flight sustaining speed whereupon he releases the airplane from the carrier catch bar 40 to proceed on his journey to the next destination, after which the operator at the tower again retards and shuts-off the rheostat switch to stop carrier rotation until it is desired to land another airplane. This is a real advantage when it is necessary to "take-off" from a very limited space. Thus, the driving mechanism of the present invention, to drive the carriers about the circular track 18 at the time the airplane is to "take-off", helps to quickly bring the plane up to flying speed momentum, and also cuts down the frictional resistance or pull which the carriers would cause when movement is dependent entirely upon the airplane propeller action. The present invention thus provides a real advantage, especially where it is necessary to "take-off", in a limited space.

If desired, the circular track 18 may be provided with two or more carriers 26 as shown in Figs. 1 and 2. The carriers are held in predetermined spaced relation by an annular ring 70 extending to each of the carriers and held thereon by cap plates 71. With this annular ring it is possible to drive all of the carriers with a single electric motor 44, if desired. However, in its preferred form, it is probable that each of the carriers will be provided with a motor. The provision of several carriers, each having a catch bar 40 travelling about the circular track when the airplane approaches to land, makes it considerably easier for the airplane pilot to have the cooperating hook-like device 42 on the airplane become attached to the landing structure.

Of particular importance, the present invention also provides an arrangement which makes it possible for the airplane, while in full flight, to close a carrier driving motor circuit and thereby cause the carriers 26 to travel in preparation for receiving the airplane. Further, the present invention also provides other means in the motor circuit which enables the pilot in the airplane to again open the motor circuit after the airplane has engaged the catch bar 40 on the carriers to stop the motor operation and carrier travel, or to start and stop electric motor rotation and carrier movement in order to move the carrier supported airplane into any desired place on the circular track 18.

To this end, the present invention provides an airplane actuable switch 72, preferably at the apex of the tower 16, of such construction that it may be actuated by the airplane while it is in full flight. In the present preferred form, it comprises a convex and tubular base 73 resting upon a plate 74 which is mounted on the top of the tower. Upon this convex base there is mounted an actuator element 75 which is held in place by means of a concave shell 76, which also serves to hold the convex base on the plate when bolts 77 are passed through these parts. A dome 78 on the shank 79 portion of the actuator element serves to keep the interior of the switch mechanism comparatively free of moisture. The annular flange 80 portion of the convex base is provided with a number of small apertures 81 to accommodate the bottom end of coiled springs 82 which in turn engage the bottom end of the actuator element and serve to keep this part in a normal inoperative position as shown in Fig. 5.

Fitting into the shank 79 and projecting vertically upwardly from the actuator element is a long rod 83 of rubber or other substantially resilient material. Coaxial with this rod but insulated therefrom is another vertically extending rod 84 which is screwed into the actuator element and is locked in place by the check-nut 85. This rod forms the movable contact member of the airplane actuated switch and is provided near its center with a coiled spring 86. Near the bottom end of the movable contact member is a fixed contact bushing 87 which is mounted on an insulator 88, the latter being forced into an annular recess 89 on the bottom of the convex base 73.

The wiring for this switch comprises a lead 90 connected to the movable contact 84 and another lead 91 extending from the contact bushing 87. The switch 72 is normally maintained in an open circuit position by means of the springs 82 as shown in Fig. 5; however, if the rod 83 is tilted in any direction at all, by means of an airplane in flight or in other ways, the actuator element 75 in its universal movement causes the movable contact 84 to engage the bushing 87 and thereby close the circuit, for purposes hereinafter more fully set forth.

The resilient mounting of the actuator element is such that the airplane will not be subject to any shock even though it engages the element while flying at a fast speed, for the rod 83 is sufficiently resilient to give at first impact, and the springs 82 on the actuator element also yield. The spring 86 on the movable contact 84 permits further yielding movement of the actuator element after the switch contacts 84 and 87 engage. The springs 82 move the switch to the normal inoperative position after the airplane moves out of engagement with the rod 83.

The present invention also provides another switch 92 on the carrier, having an inoperative position and two operative positions, which is provided with extension cords 93 and 94 so as to be operable by an occupant of the airplane after it engages the catch bar in order to slow down and stop the motor 44 and airplane carrier travel around the track 18; also, to start carrier travel for the purpose of taking off, so that it is not necessary to use a ground operator at any time for the landing or "take off" of an airplane, as will be described in greater detail hereinafter.

Coming now to the operation of the improved electrical motor control arrangement, reference should be had first to Fig. 6 which gives a diagrammatic representation of the wiring arrangement. Similar reference numerals will be applied to those parts which correspond with the ground operator control wiring circuit parts heretofore described. 52 represents any suitable source of current supply and comprises a wire 53 which extends to one terminal 54 of the electric motor 44. Connected to the feed wire 53 is a lead 90 which is connected to the movable contact member 84 of the switch 72, and a cooperating lead 91 extends from the contact bushing 87 to a terminal 95 of the relay 96 while another lead 97 also extends from the positive feed wire 53 to a contact 98 carried by a relay armature 99, thence through another relay contact 100 and lead 101 also to the terminal 95 of the relay coil 96. The negative feed wire 102 extends to the rheostat 103, which is normally held in closed minimum resistance position by means of a spring 104, thence from the rheostat through the wire 105 to the contact lug 106 on the relay armature 99; and, when the relay is closed, through the contact 116 and wire 117 to the motor terminal 59. Another wire 107 extends from the negative lead wire 105 to a center pole 108 of the two-way switch 92 on the carrier, and thence, depending upon the position of the two-way switch, either through the switch bar 109 and contact 110 to the lead 111 on to the other terminal 112 of the relay or through the switch bar 113, contact 114, and lead 115 to the motor terminal 59.

Normally, the entire circuit is open as shown in Fig. 6 and the motors will then be inoperative because of the break in the negative feed line to the motor 49 either between the switch bar 113 and contact 114 or between the armature contact 106 and relay switch contact 116. However, the entire system can be made operative by the mere expedient of having any part of an airplane strike the resilient rod 93, preferably with a part of the landing gear, although the wing or any other part of the plane may engage it without danger because of its resiliency, and the contact need be but for an instant. When the rod 83 is so engaged, it moves the actuator element 75 arcuately against the pressure of one of the springs 82 and thereby moves the contact 84 into engagement with the contact bushing 87. Thus, when the airplane engages the rod 83, and closes the circuit between the contacts 84 and 87, current will flow through the lead 90 and movable contact 84 and contact bushing 87, thence through the lead 91 to the relay solenoid terminal 95, while the regular positive feed wire 53 runs directly to the motor, and at the same time the negative feed will pass through the regularly closed rheostat switch 103, thence through the wires 105 and 107 to the switch contacts 108 and 110 and switch bar 109, lead 111 to the other terminal 112 of the relay to close the circuit for the relay solenoid, thereby pulling the relay armature 99 into a closed position with the relay contacts 106 and 116 in engagement to completely close the motor circuit line and thereby cause the motor to operate. Although the switch 72 was closed only for an instant, the relay 96 is maintained in closed position by means of the armature 99 moving into operative position, for in this movement it closes sliding contacts 98 and 100, thereby providing a continuous feed of positive current to the relay solenoid through the wires 97 and 101.

When an airplane has so closed the circuit, the motors will quickly be brought up to full operating speed thereby causing the carriers 26 to travel at a predetermined velocity about the circular track 18 and the airplane in turn will, under the guidance of the pilot, be banked, and caused to travel in a circuitous route under the supporting circular track until the hooklike device 42 engages the catch bar 40 on the carrier. Then, according to the present invention, the pilot in the airplane, or some other operator therein, may reach out and grasp the shorter extension cord 93 and move the two-way switch 72 into a neutral position to break the circuit, thereby breaking the negative feed to relay terminal solenoid 112 to deenergize the relay coil and allow the armature 99 to return to inoperative position again under the influence of a spring 118 and thereby discontinue the feed of negative current through the contacts 106 and 116, and the wire 117 to the motor terminal 59, whereupon the motor stops, excepting for rotation which will be caused by momentum of the airplane and the carrier. Even though the pilot releases the extension cord 93 and the switch bar 109 returns into engagement with the contact 110 under the influence of the spring 119, it will not close the motor circuit again because the positive feed line for the relay coil was broken when the armature 99 moved to inoperative position and caused the contacts 98 and 100 to move out of engagement with each other.

With this improved wiring arrangement, the feed wires are again passed over the guy rods 19 or 20 and from the circular track to the carrier through current rail 60 and spring bar 64 and through current rail 65 and spring bar 67; these being shown diagrammatically at 119 and 120 in Fig. 6, and the relay and related wires may be supported in any suitable manner on the carrier 26.

After the airplane has discharged and/or taken on new passengers, fuel, changed pilots or the like and it is desired to "take-off" again, the wiring arrangement of the present invention makes it possible for the airplane pilot to again start the airplane carrier in its travel, by the mere expedient of pulling down to the full extent on the short extension cord 93 to close the circuit between the wires 107, contact 108, bar 113, contact 114 and lead 115 in order to pass negative current to the motor directly, rather than through the relay, and the pilot holds the switch in this closed position while the carrier gradually increases in speed until it is traveling at a speed substantially equivalent to airplane flight sustaining speed and the airplane motor in turn is speeded up by the pilot until the speedometer indicates flight sustaining speed whereupon he releases the extension cord 93 and at substantially the same time releases engagement of the hook-like device 42 from the carriage catch bar 40 in order to "take-off" from the airplane supporting structure. When the airplane pilot releases his hold upon the extension cord, the spring 119 again causes the bar 109 to move into engagement with the contact 110, thereby preparing the relay circuit so that the entire circuit will again be made operative for the carrier motor 44 should another airplane engage the switch rod 83 in the manner hereinbefore outlined. Thus, it will be seen that the present invention provides a comparatively simple means for starting and stopping propulsion or travel of the airplane supporting carriers 26 of the present invention without the need of a separate operator, as would ordinarily be required.

At stations of this kind, where landings and taking-offs are frequent, and where it might also be desired to have a separate operator to control the starting and stopping of the carriers 26, possibly just for a portion of the day, the circuit can be quickly converted into a combination one which may be operated either by airplane and pilot, or by a separate operator in the tower 16, by the mere provision of a second contact 122 on the switch 103 and the provision of an extra lead 123 running from the contact 122 to the lead 117. Thus, when the operator moves the switch 103 from the station shown in Fig. 6 where it is normally maintained by the spring 104 into engagement with the contact 122, negative feed will pass through the line 123 and 117 to one motor terminal 59 while the positive feed, as heretofore described, passes through the wire 53 to motor terminal 54 to operate the motor.

Besides the advantages already pointed out, the present invention has the further advantage of making it possible for the pilot to start and stop carrier 26 on the track 18 in order to bring the airplane into the best position with respect to the landing platform 68 or with respect to the fueling hose 124, or any other devices which may be on the tower, and also makes it possible for the pilot to start and stop electric motor operation in order to maintain the carrier at a desired speed just previous to the "take-off".

When only one carrier 26 is used on the circular track 18, it is possible, according to the present invention, to lower the airplane to the ground beneath the circular track by means, shown in Figs. 3 and 4, comprising a separable track section 125 adapted to nest in notched section 126 of the track, which may be disconnected therefrom by withdrawing the plungers 127 from the lugs 128 on the separable section and then lowering the section, carrier and airplane by playing out cables 129 by any suitable means until the airplane is placed upon the ground, for repairs, movement to a hangar, or the like, as described substantially in my aforesaid copending application. After the airplane is so landed the airplane may be disconnected from the carriage and the latter then returned by the cables to its operative position in the notched section where it is again locked in place with the plungers 127. The current feed wires are connected to the current rails 60 and 65 at points outside the separable section so that whenever the latter is disconnected or let down the circuit is disconnected from the motor supported on the separable section. Thus it is impossible for an airplane in flight or a ground operator to inadvertently start carriage motor rotation when the track and carriage are not properly prepared.

Figure 8:
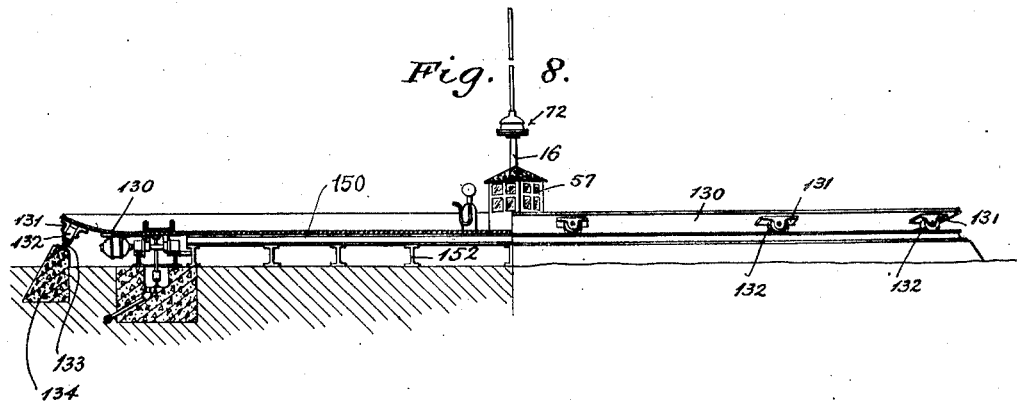
Fig. 8 is a side view, partly in section, of the device shown in Fig. 7.

Figs. 7 to 9 inclusive show a modified form of the present invention, in which the carrier instead of being movable about a large circular track, comprises a circular track which in itself is movable, and upon which the airplane may be caused to alight rather than to be hooked upon some moving carriage.

The modified structure preferably comprises a large annular disc ring or carrier 130 which is provided near its outer periphery with a number of brackets 131 to support rollers 132 engaging with rails 133 carried by a concrete or similar abutment 134. The under side of the carrier is provided with a plurality of brackets 135 each of which has an inner vertically extending arm 136 upon the lower end of which there is provided a stud 137 which supports a wheel 138 to engage a rail 139 on the abutment 140. Each of the brackets 135 is also provided with two outer vertically extending arms 141 and 142 upon which a rotatable shaft 143 is mounted. In the former, the stud was fixed to the arm 136 and the wheel was mounted for free rotation thereon, but in the latter a wheel 144 is fixed to the shaft and the shaft extends through suitable roller bearings in the arms 141 and 142, and the wheel engages a second rail 145 which is also mounted upon the abutment 140. Midway between these two brackets a gear 146 is fixedly mounted on the shaft 143 to be rotatable therewith. Underneath the carrier 130 and mounted preferably upon the bracket 135, is an electric motor 44 having upon its armature shaft 147 a drive gear 148 to engage with a gear 146 on the shaft 143. Preferably, the carrier is provided with a number of these wheel brackets 135 assemblies on the underside, several of which may be provided with the motor drive.

Within this large circular carrier 130 there is provided a flat circular platform 150 which may be used as a passenger and baggage platform. Near the center of this platform there is provided an operator's station 57 and a tower 16 which extends substantially above the level of surrounding objects. As with the airplane landing device shown in Figs. 1 to 5 and hereinbefore described, this modified form of the present invention may also be advantageously located on the top of buildings. Preferably the platform is so arranged that it is not necessary to move passengers or freight over the carriage onto the platform when the device is built on ground level, but, in its preferred form, a tunnel is provided extending underneath the carrier 130 and underneath the platform to a point somewhere near the center of the platform where a stairway 151, elevator or ramp is provided for movement to the platform top level, and when the device is built on the top of a building it may be arranged so that the regular elevators and stairways extend to the platform top level. As shown in Figs. 8 and 9, the inner platform is mounted on suitable supports 152 which maintain it in a position substantially adjacent the inner edge of the large circular carrier 130.

Operation of the disc carrier 130 and motor drive may be effected by the operator in the small station 57 by the provision of a simple circuit as shown in Fig. 10, comprising the lead-wire 53 extending to either of the rails 139 or 145, thence by any suitable means to one motor terminal, and the other lead extending to a switch 56, then to a circuit rail 153, there to be engaged by a roller 154 on a spring arm 155, as shown in Fig. 9, for transmission of electricity to the other motor terminal, substantially similar to the spring bar and contact arrangement shown in Figs. 3 and 4, and hereinbefore described for the preferred form of this invention. Thus, when the operator sees an airplane approaching the landing structure he need merely close the circuit with switch 56 to cause the motor 44 to rotate, and the motor through the gears 148 and 146 and wheel 144 drives the carriage at a predetermined rate of speed, approximating that of airplane flight sustaining speed, and the pilot controls his machine so that it closely approaches the speed of travel of the carriage and alights upon the upper face of the carrier 130. The pilot then throttles down the airplane motor speed and the ground operator gradually decreases the speed of the rotating carrier until both the airplane and carrier are brought to a stop.

The airplane may then be moved from the carrier 130 to the platform 150 for repairs, to be placed in a hangar, or to be refueled, thereby clearing the carrier for the "landing" or "takeoff" of other planes. After the airplane is prepared for taking off, the operator closes the carriage motor circuit to offset carrier rotation and the airplane pilot brings the airplane up to flight speed, then "takes-off" from the carrier, after which the operator again opens the motor circuit to bring the carrier to a stop again, until another airplane approaches for the purpose of landing, as with carrier and supporting structure shown in Figs. 1 to 5, inclusive, hereinbefore described in detail.

If desired, the carrier 130 may be provided with vertical arms 154 adapted to engage the axle bar 155, or other part of the airplane, to stop airplane travelling movement on the carrier after it alights thereon, and at the time of "taking-off", the airplane may be placed just before the arms 154 so that it cannot roll back off the carrier as the latter is made to rotate. As nearly all airplanes are now provided with pilot controlled brakes for wheels on the landing gear, the arms 154 may not be needed; however, there is an advantage in their use where it is desired to use this type of landing device with older airplanes not provided with brakes.

This modified form of the present invention might also be provided with the improved automatic circuit controlling means hereinbefore described. As shown in Fig. 8, it is already provided with the tower 16 and airplane actuable switch 72 and any number of leads might be extended to the movable carrier 30 by providing a plurality of rails in the trough 156 and a corresponding plurality of spring bars 155 on the carrier and the provision of any suitable bracket construction on the carrier to carry the switch controls, so that it will be easy for the pilot or other operator to reach out and manipulate them. This is fully shown and described in the preferred form of the present invention.

Although the use of the present invention has hereinbefore been described for use with airplanes, it should be understood that it may also be used for dirigibles and lighter than aircraft.

The automatic circuit control of the present invention comprising the airplane actuable switch 72 may also be used to control the circuit for devices other than the carrier motor 72. As shown in Fig. 6, it may be used to control the flood lighting of the field or landing structure. In this adaptation, a wire 160 is extended from the terminal 59 side of the motor circuit to any number of lamps 161 advantageously placed, and the complementary feed for the lamps comprises a wire 162 extending from the other terminal 54 side of the motor circuit to a switch 163 thence to the lamps. With this arrangement, it is merely necessary for the ground operator, or a tuning mechanism, to close the switch 163 at nightfall, then when an airplane actuates the switch 72 to close the motor 44 circuit, as hereinbefore described in detail, current will flow through the wires 160 and 162 and the closed switch 163 to light the lamps 161. After the airplane is safely attached to the carrier 26 and the lamps are no longer needed, their use is automatically discontinued when the motor 44 circuit is broken through the carrier switch 109—110. The airplane actuable switch may be used in various other ways.

The carriers 26 of the present invention may also be provided with a mail bag landing and take-off platform held on the carrier by cross bolts 30 and 33 with a bracket 165 extending upwardly above the I beam 18 and above the guy rods 19 and 20, whereby it is possible for an airplane to approach the landing device and drop mail bags in a confined area with accuracy because the platform travels at substantially the same speed as the airplane. An even greater advantage is obtained with this arrangement when it is desired to pick up mail bags from a station by providing the mail bags with a loop or bail, placing them in the bracket 165 and providing a hook-like device on the bottom of the airplane, similar to arrangements now used on trains to pick up mail without stopping, for the airplane will not be subjected to a shock or pulled out of the pilot's control when the mail bags are made to travel at substantially the same speed as the airplane when the latter picks up bags. Although this arrangement has been described for use with mail bags, it may be used for the landing and taking-off of freight in the same manner.

Other variations and modifications may be made within the scope of this invention and portions of the improvements may be used without others.

Having thus described the invention, what is claimed as new and for which it is desired to obtain Letters Patent, is:—

1. In an airplane supporting structure, means for receiving and supporting an airplane; and other means controllable by the airplane to automatically propel the airplane receiving and supporting means.

2. In an airplane supporting structure, means for receiving and supporting an airplane; an electric motor to propel the airplane receiving and supporting means; a motor circuit; and a switch in said motor circuit adapted to be operated by the airplane while it is in flight.

3. In an airplane supporting structure, means for receiving and supporting an airplane; a plurality of electric motors to propel the airplane receiving and supporting means; a circuit for said motors; and a switch in said circuit adapted to be operated by the airplane while it is in flight.

4. In an airplane supporting structure, means for receiving and supporting an airplane; an electric motor to propel said means; a circuit for the motor; a switch in said circuit; and means associated with said switch to make possible the operation thereof by the airplane while it is in flight.

5. In an airplane supporting structure, means for receiving and supporting an airplane; an electric motor to propel said means; a circuit for the motor; a switch in said circuit; and resilient means associated with said switch to make possible the operation thereof by the airplane while it is in flight.

6. In an airplane supporting device, a carrier for receiving and supporting an airplane; an electric motor to propel said carrier; a circuit for the motor; a switch in said circuit adapted to be operated by the airplane while it is in flight to start electric motor and carrier rotation; and another switch for said circuit on the carrier adapted to be operated by an occupant of the airplane to stop electric motor and carrier rotation after the carrier receives and supports the airplane.

7. In an airplane supporting structure, a tower; a circular track supported by said tower; an airplane carrier supported by the circular track; and means on the carrier for automatically moving the carrier and the airplane supported thereby relative to the track.

8. In an airplane supporting device, a receiving and supporting carrier comprising a large rotatable banked disc upon which the airplane may alight.

9. In an airplane supporting device, a receiving and supporting carrier comprising a large rotatable annular disc upon which the airplane may alight; and means on the supporting device for rotating said annular disc so that its peripheral speed is substantially equivalent to flight maintaining speed of the airplane.

10. In an airplane supporting device, a receiving and supporting carrier upon which the airplane may alight and travel relatively; means for moving the carrier and other means on the carrier to limit relative travelling movement of the airplane on the carrier.

11. In an airplane supporting device, a receiving and supporting carrier comprising a large rotatable annular disc upon which the airplane may alight and travel upon; means for moving the carrier; and other means on the carrier to limit travelling movement of the airplane on the carrier.

12. In an airplane supporting device, a circular track, a movable airplane receiving and supporting carrier on the circular track and adapted to travel thereon; means for moving the carrier; and other means on the carrier to engage the airplane and carry the airplane along with it during its rotation.

13. In an airplane landing and launching device, a circular track, a movable airplane receiving and supporting carrier on said circular track capable of rotating travelling movement thereon; means for moving the carrier; and other means on the carrier to engage the airplane and carry the airplane along with it during its rotation, said means pivotally holding the airplane and allowing the same to swing outwardly away from the track in response to centrifugal force.

THEODORE E. STEIBER.